United States Patent
Fredette et al.

(10) Patent No.: US 6,987,727 B2
(45) Date of Patent: Jan. 17, 2006

(54) AUTOMATIC PROTECTION SWITCHING USING LINK-LEVEL REDUNDANCY SUPPORTING MULTI-PROTOCOL LABEL SWITCHING

(75) Inventors: Andre N. Fredette, Groton, MA (US); Loa Andersson, Jlvsjo (SE); Naganand Doraswamy, Arlington, MA (US); Anoop Ghanwani, North Billerica, MA (US)

(73) Assignee: Nortel Networks Limited (CA)

( * ) Notice: Subject to any disclaimer, the term of this patent is extended or adjusted under 35 U.S.C. 154(b) by 113 days.

(21) Appl. No.: 10/771,201

(22) Filed: Feb. 3, 2004

(65) Prior Publication Data
US 2004/0156310 A1 Aug. 12, 2004

Related U.S. Application Data

(63) Continuation of application No. 09/471,463, filed on Dec. 22, 1999, now abandoned.

(51) Int. Cl.
*H04J 1/16* (2006.01)

(52) U.S. Cl. .................. 370/225; 370/228; 370/248
(58) Field of Classification Search ......... 370/217–218, 370/225, 228, 241–242, 244, 248, 250; 714/1, 714/2, 25, 100
See application file for complete search history.

(56) References Cited

U.S. PATENT DOCUMENTS

| | | | |
|---|---|---|---|
| 5,581,543 A | 12/1996 | Natarajan | |
| 5,646,936 A | 7/1997 | Shah et al. | |
| 5,875,172 A | 2/1999 | Tabata | |
| 5,999,286 A * | 12/1999 | Venkatesan | 398/5 |
| 6,205,117 B1 * | 3/2001 | Doshi et al. | 370/228 |
| 6,331,905 B1 * | 12/2001 | Ellinas et al. | 398/2 |
| 6,353,593 B1 * | 3/2002 | Chen et al. | 370/216 |
| 6,535,481 B1 * | 3/2003 | Andersson et al. | 370/225 |
| 6,775,229 B1 * | 8/2004 | Mo et al. | 370/220 |
| 6,778,492 B2 * | 8/2004 | Charny et al. | 370/228 |

FOREIGN PATENT DOCUMENTS

EP    0838344 A2    4/1998

OTHER PUBLICATIONS

EP00311286.9–2416 International Search Report dated Jul. 24, 2003.
Viswanathan, Evolution of Multiprotocol Label Switching, IEEE Communications Magazine, May 1998, pp. 165–173.
Vlefaucheur, IETF Multiprotocol Label Switching (MPLS) Architecture, IEEE International Conference on ATM, Jun. 22, 1998, pp. 6–15.

* cited by examiner

*Primary Examiner*—Frank Duong
*Assistant Examiner*—Melanie Jagannathan
(74) *Attorney, Agent, or Firm*—Steubing McGuinness & Manaras LLP

(57) ABSTRACT

A computer network has a plurality of routers that deliver data packets to the network via a plurality of links. At least one router provides automatic protection switching in the event of a link failure. The at least one router includes a plurality of data interfaces for streams of data packets to enter and exit the at least one router; and a backup controller. The backup controller includes a backup path manager, a link monitor, and a backup packet processor. For at least one link of the routing node, the backup path manager identifies a backup routing path for forwarding affected data packets in the event of a failure of the at least one link. The link monitor monitors the plurality of links to determine when a link fails. When a link which has a backup routing path fails, the backup packet processor attaches backup routing path instructions to affected data packets routed over the failed link, and forwards the affected data packets via the backup routing path.

54 Claims, 3 Drawing Sheets

AUTOMATIC PROTECTION SWITCHING USING LINK-LEVEL REDUNDANCY SUPPORTING MULTI-PROTOCOL LABEL SWITCHING

This application is a continuation of U.S. application Ser. No. 09/471,463 filed Dec. 22, 1999, which was abandoned Mar. 9, 2004.

TECHNICAL FIELD

The present invention relates to computer networks, and more specifically to a computer network that provides protection switching to reroute data packets in the event of a network link failure.

BACKGROUND ART

The various links of a computer network are paths between network nodes that communicate streams of data. In an Internet Protocol (IP) based computer network, data routing protocols such as Open Shortest Path First (OSPF), Intermediate System-Intermediate System (IS-IS), and Routing Information Protocol (RIP) are used to determine the path that data packets travel through the network. As a specific example, OSPF is a link-state protocol in the IP suite that enables routers to exchange information regarding topological changes within the network, as the link state database is modified. With this information, each router builds a shortest-path tree with itself as the tree root to identify the shortest path from itself to each destination and to build its routing table.

A router in a label switching network may sometimes explicitly route a particular data packet to another intermediate router that is not the ultimate destination of the packet, even though the two routers are not consecutive on the hop-by-hop path for that packet. For example, the affected data packet may be encapsulated inside a network layer packet whose destination is the intermediate router. This process establishes a "tunnel" between the two routers, and any data packet so handled is referred to as a "tunneled packet." A hop-by-hop tunnel follows the hop-by-hop path between the two routers. A tunneled packet that follows other than the hop-by-hop path is said to use an explicitly routed tunnel.

Occasionally, a link between two network routers may fail. When a link fails, the routing protocols are used to advertise the failure throughout the network. Most routers can detect a local link failure relatively quickly, but it takes the network as a whole a much longer time to converge. This convergence time is typically on the order of 10–60 seconds depending on the routing protocol and the size of the network. Eventually, all of the involved routers learn of the link failure and compute new routes for data packets to affected destinations. Once all the routers converge on a new set of routes, data packet forwarding proceeds normally.

While the network is converging after a link fails, transient loops can occur which consume valuable network bandwidth. A loop occurs when two or more intermediate routers in a given network path fail to update their internal representations of the network topology at the same time, and end up repeatedly passing data traffic between themselves rather than on to the correct destination. Loop prevention algorithms have been proposed to eliminate such transient loops. When using loop prevention algorithms, existing routes are maintained until the network has converged and the new routes have been proven to be loop-free. Loop prevention algorithms have the advantage that data packets flowing on unaffected routes are not disrupted while transient loops are eliminated. One drawback of loop prevention algorithms, however, is that data packets directed out of a failed link get lost, or "black holed," during the convergence. Moreover, since loop prevention algorithms also extend the convergence time somewhat while new routes are being verified to be loop-free, additional data may be lost on the failed link.

SUMMARY OF THE INVENTION

A representative embodiment includes a backup controller that provides protection switching in the event of a link failure of a routing node that delivers data packets to a computer network via a plurality of links. The computer network may use, for example, a label switching routing protocol. The backup controller has a backup path manager, a link monitor, and a backup packet processor. For at least one link of the routing node, the backup path manager identifies a backup routing path for forwarding affected data packets in the event of a failure of the at least one link. The link monitor monitors the plurality of links to determine when a link fails. When a link which has a backup routing path fails, the backup packet processor attaches backup routing path instructions to affected data packets routed over the failed link, and forwards the affected data packets via the backup routing path.

A further embodiment may include a backup controller as described above in a data router that delivers data packets to a computer network via a plurality of links. The data router provides protection switching in the event of a link failure. The data router also has a data interface for data packets to enter and exit the router, and a backup controller. Such a data router may also have a failed link recalculator that establishes a new network route to replace a failed link. The failed link recalculator may use a loop prevention algorithm, after a link failure, for determining that the network has converged and is loop-free.

In still a further embodiment, a data router as described above may be included in a computer network having a plurality of data packet streams. The network has a plurality of subnetworks, each subnetwork having at least one application that generates a stream of data packets for transmission over the computer network; and a plurality of routers that deliver data packets to the network via a plurality of links, at least one router providing protection switching in the event of a link failure.

A representative embodiment also includes a method of providing protection switching in the event of a link failure of a computer network routing node that delivers data packets to a computer network via a plurality of links. The method includes identifying, for at least one link of the routing node, a backup routing path for forwarding affected data packets in the event of a failure of the at least one link; monitoring the plurality of links to determine when a link fails; when a link which has a backup routing path fails, attaching backup routing path instructions to affected data packets routed over the failed link; and forwarding the affected data packets via the backup routing path. In a further embodiment, a loop prevention algorithm may be used after a link failure to determine that the network has converged and is loop-free.

Another embodiment includes a computer program product for use on a computer system for providing protection switching in the event of a link failure of a computer network routing node that delivers data packets to a computer network via a plurality of links, the computer program product comprising a computer-usable medium having computer-readable program code thereon. The computer readable program code includes program code for identifying, for at least one link of the routing node, a backup routing path for forwarding affected data packets in the event of a failure of the at least one link; program code for monitoring the plurality of links to determine when a link fails; program code for, when a link which has a backup routing path fails, attaching backup routing path instructions to affected data packets routed over the failed link; and program code for forwarding the affected data packets via the backup routing path.

In further embodiments of any of the above, the backup controller may further advertise a link failure to the network using a routing protocol. The backup routing path instructions may include a label stack based on Multi-Protocol Label Switching (MPLS), and the label stack may include labels for a packet source and a packet destination. The backup routing path may be a Label Switched Path (LSP), based on, for example, network topology information such as could be derived from a network protocol.

BRIEF DESCRIPTION OF THE DRAWINGS

The present invention will be more readily understood by reference to the following detailed description taken with the accompanying drawings, in which.

DETAILED DESCRIPTION OF SPECIFIC EMBODIMENTS

Representative embodiments of the present invention use a label switching protocol to establish backup paths with explicit routing for use in the event of a link failure in a computer network. A label is a short, fixed length, physically contiguous, locally significant identifier which is used to identify a given data stream in a label switching network. Multi-Protocol Label Switching (MPLS) is an example of a network layer-based label switching routing protocol that uses a forwarding paradigm based on label swapping to forward data traffic. Data forwarding between two adjacent network nodes using MPLS labels is known as a label switched hop. The concatenation of one or more label switched hops defines a Label Switched Path (LSP) that allows data packets to be forwarded from one MPLS node to another MPLS node by swapping labels. Explicit routing of an LSP is when the LSP is specified by the source of a data stream. The sequence of nodes defined by the LSP are defined by a layered stack of MPLS labels that typically may include a packet source label, a packet destination label, and labels for the nodes in the defined LSP.

In exemplary embodiments, each router establishes a backup path for each protected local link using MPLS-based Label Switched Path (LSP) tunnels. That is, a data packet sent over such a backup path follows an explicitly specified MPLS-LSP. Data packets are automatically rerouted on the backup link in the event that a protected link fails.

Figure 1:
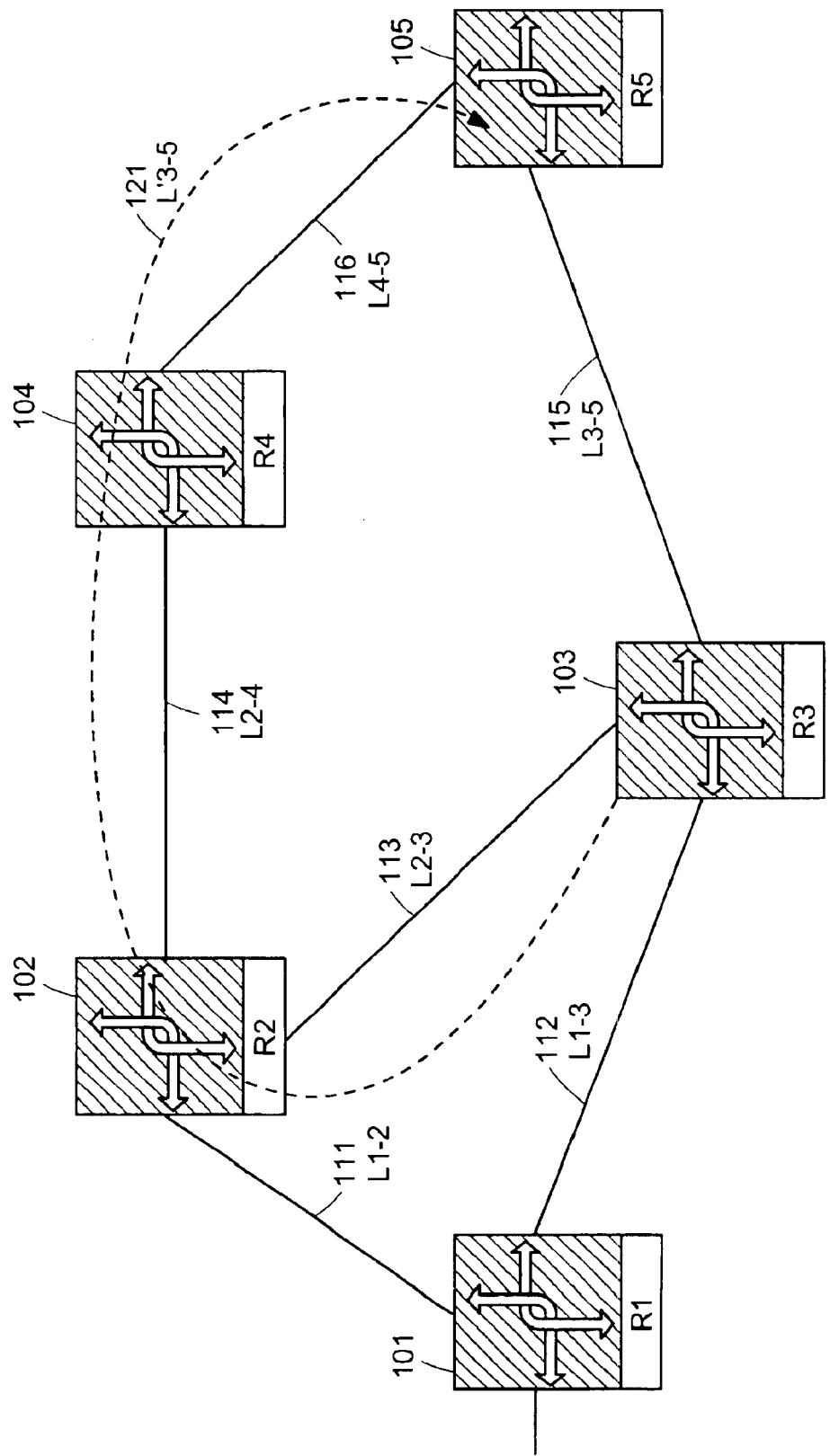
FIG. 1 is an illustration of a computer network which provides label switching-based backup path protection switching according to a representative embodiment.

FIG. 1 is an illustration of an computer network capable of providing label switching-based protection switching in accordance with illustrative embodiments of the present invention. Network routers R1 101–R5 105 are connected by primary network links 111–116. Thus, in the network shown in FIG. 1, router devices R1 101 and R2 102 are connected by primary network link 111, R1 101 and R3 103 are connected by primary network link 112, R2 102 and R3 103 are connected by primary network link 113, R2 102 and R4 104 are connected by primary network link 114, R3 103 and R5 105 are connected by primary network link 115, and R4 104 and R4 104 are connected by primary network link 116.

For each primary network link, a backup path is established to be used in the event that the primary link fails. For example, if link L 3-5 115 fails, router R3 103 immediately starts to send data packets that would normally go to router R5 105 over link L 3-5 115 on LSP backup path L' 3-5 121. When router R5 105 receives a packet via the backup path L' 3-5 121, it treats the packet just as if the packet had been received on the original failed link L 3-5 115. For clarity, FIG. 1 shows only one such backup path 121, which represents the MPLS-based backup LSP for primary link 115 from router R3 103 to router R5 105. In representative embodiments, there may be a backup path for every primary network link.

Figure 2:
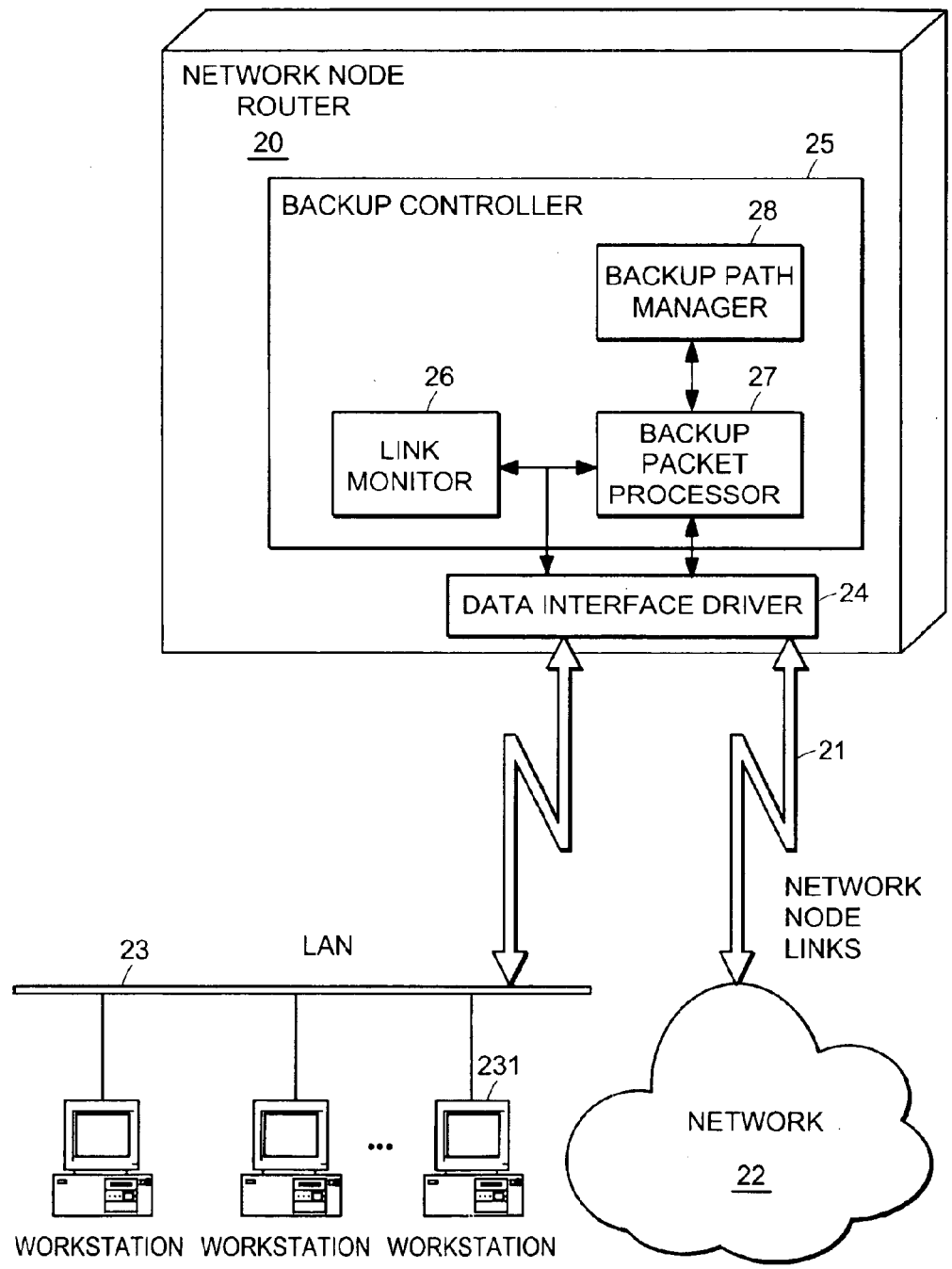
FIG. 2 is an illustration of a network node router which supports backup paths according to a representative embodiment.
Figure 3:
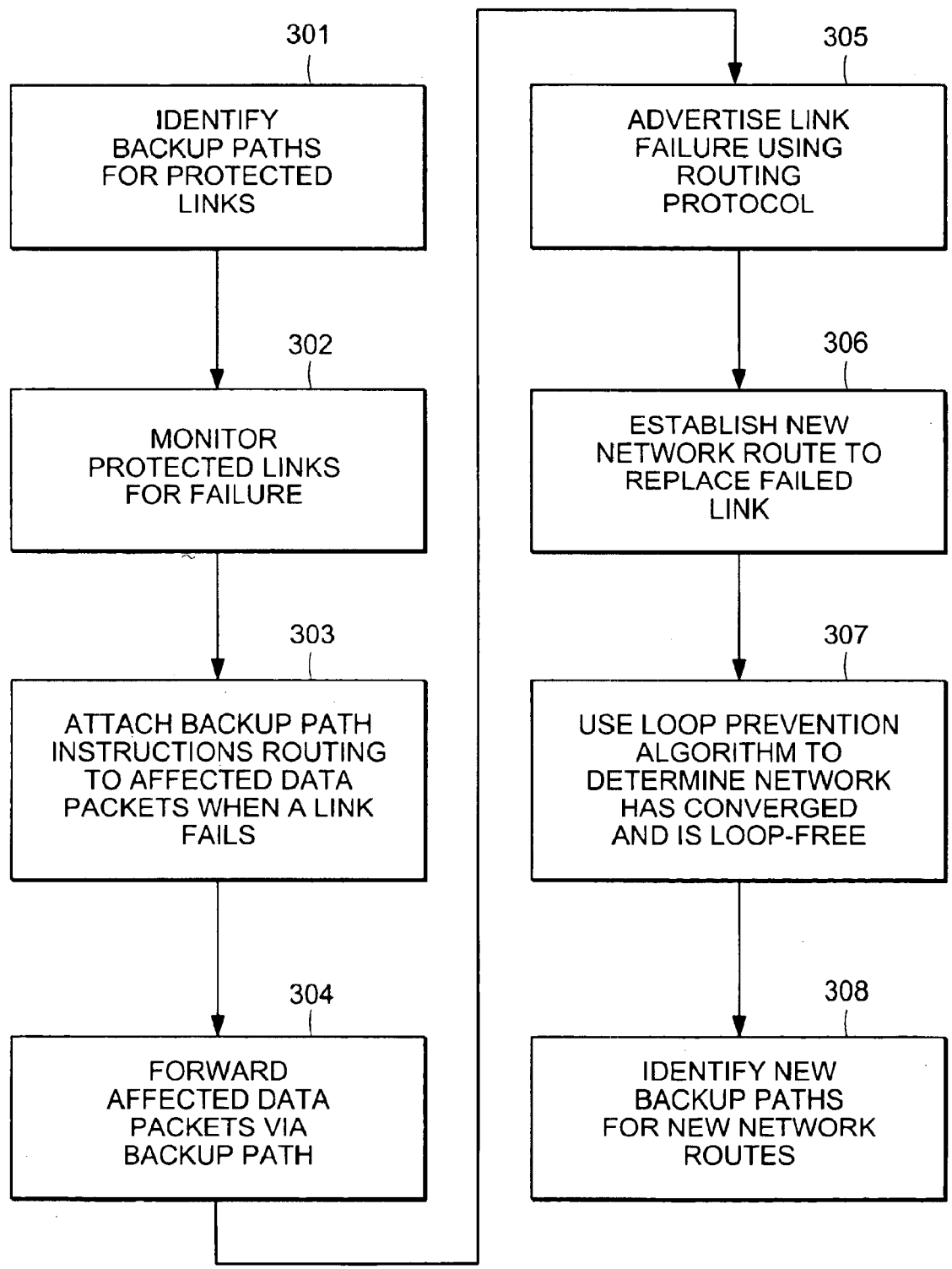
FIG. 3 is a flow chart illustration of the logical steps in a method of providing backup path protection switching according to a representative embodiment.

FIG. 2 is an illustration of a network router device which supports backup paths according to a representative embodiment. FIG. 3 is a flow chart of illustrative method steps in providing backup path protection with the router device of FIG. 2. Network node router 20 is a part of a computer network 22, which are in mutual communication via a plurality of network node data links 21. Router 20 also serves to connect one or more local area networks (LANs) 23 having one or more workstations 231. Data packets enter and exit the router 20 as controlled by a data interface driver 24 which is connected to the network node links 21. Router 20 also includes a backup controller 25 having a link monitor 26, a backup packet processor 27, and a backup path manager 28.

For each link to be protected, a backup path manager 28 identifies a backup path for forwarding affected data packets in the event that the protected link fails, step 301. Backup paths can be hand configured or "automatically" computed using a link-state routing protocol, e.g., Open Shortest Path First (OSPF). To automatically compute a backup path, the backup path manager 28 removes the primary link to be protected from its topology database, and then recomputes the shortest path to the destination router using a shortest-path algorithm. In typical embodiments, explicitly routed MPLS Label Switched Path (LSP) tunnels are used since the backup path follows a sub-optimal route that does not correspond to the normally routed path. Alternative embodiments may use another label switching protocol other than MPLS.

A link monitor 26 monitors protected links of the router for failure, step 302. A link may fail, for example, if the path between two nodes is physically disrupted, or if a router loses power, disabling the connected links. Various different mechanisms may be used to detect such a link failure. For example, in a 100BASE-TX link integrity test, Fast Ethernet transceiver circuits continually monitor the receive data path for activity as a means of checking that the link is working correctly. The signaling system used for 100BASE-TX segments is based on the ANSI FDDI signaling system, which sends signals continually, even during idle periods of no network traffic. Therefore, activity on the receive data path is sufficient to provide a continual check of link integrity.

When the link monitor 26 initially determines that a protected link has failed, in step 303, backup packet processor 27 attaches backup path instructions from the backup path manager 28—for example, MPLS labels to affected data packets, which are forwarded through the network 22 over the backup for the failed link, step 304. A predetermined period of time after the first detection of a link failure, the failure may be considered to be more than a temporary phenomenon, and the link may be considered to have positively failed. The router 20 then advertises the link failure to the network 22, in step 305, using a routing protocol, e.g., Open Shortest Path First (OSPF).

New routes are determined to replace the failed link, step 306. In step 307, a diffusion-based loop-prevention algorithm determines when the network 22 has converged on new routes and is loop-free. To describe how loop prevention algorithms operate, it is important to first understand that most routing protocols use what are called "shortest-path" algorithms, which may be further sub-classified as being either distance-vector or link-state algorithms. A network node using a distance-vector algorithm, for example, knows the length of the shortest path from each neighboring node to every network destination. Based on this information, the node calculates the shortest path and next node in the path for each destination. Such nodes send to neighboring nodes update messages containing vectors of one or more entries each specifying the distance to a given destination. Receiving an update message may cause a node to generate an update message of its own. As a further example, a network node using a link-state algorithm (also called a topology broadcast algorithm) must know the topology of the entire network (or at least receive such information) in order to compute the shortest path to each network destination. Such nodes broadcast to every other node in the network, update messages containing the state of each of the node's adjacent links.

To avoid transient loops, loop prevention algorithms have been proposed based on diffusing computations, such as described by Garcia-Lunes-Aceves in *Loop-Free Routing Using Diffusing Computations*, IEEE/ACM Transactions on Networking, Vol. 1, No. 1, 1993, which is hereby incorporated herein by reference. To that end, a family of distance vector algorithms are proposed which converge in a finite time after an arbitrary sequence of link cost or topological changes, being loop-free at any given instant, and having advantageous efficiency with respect to combined temporal, message, and storage complexities. Thus, loss of data packets is avoided by using the LSP tunnels to forward the affected data packets while the loop prevention algorithm is running.

Finally, in step 308, once the new routes are confirmed to be loop-free, the routers revert from the back up path to the new routes, and the backup path manager 28 calculates new backup paths for the newly established routes.

Since representative embodiments use label switching, the present invention can operate successfully in any arbitrary network topology. It should be noted, however, that to realize full link-level protection, the network should have the property that for every two neighbors A and B connected by link L, there exists another path between A and B that does not include L. Various options may be employed with respect to network-level encapsulation on the original link. For example, the original network-layer encapsulation (e.g., IP) may be tunneled in the backup LSP. If MPLS is used on the original link, then the labeled packet may be tunneled on the backup path using MPLS label stacking. Multiple independent link failures may be tolerated using multiple layers of tunneling.

Various embodiments of the invention, or portions thereof (e.g., the link monitor 26, the backup packet processor 27, the backup path manager 28, etc.), may be implemented in any conventional computer programming language. For example, representative embodiments may be implemented in a procedural programming language (e.g., "C") or an object oriented programming language (e.g., "C++" or "JAVA"). Alternative embodiments of the invention may be implemented as preprogrammed hardware elements (e.g., application specific integrated circuits), or other related components.

Alternative embodiments of the invention may be implemented as a computer program product for use with a computer system. Such implementation may include a series of computer instructions fixed either on a tangible medium, such as a computer readable media (e.g., a diskette, CD-ROM, ROM, or fixed disk), or transmittable to a computer system via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions preferably embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

Although various exemplary embodiments of the invention have been disclosed, it should be apparent to those skilled in the art that various changes and modifications can be made that will achieve some of the advantages of the invention without departing from the true scope of the invention. These and other obvious modifications are intended to be covered by the appended claims.

What is claimed is:

1. A backup controller that provides protection switching in the event of a link failure of a routing node that delivers data packets to a computer network via a plurality of links, the backup controller comprising:

a backup path manager that, for at least one link of the routing node, identifies a backup routing path for forwarding affected data packets in the event of a failure of the at least one link, wherein the backup routing path is determined prior to a failure of the at least one link;

a link monitor that monitors the plurality of links to determine when a link fails;

a backup packet processor that, when a link which has a backup routing path fails, attaches backup routing path instructions to affected data packets routed over the failed link, and forwards the affected data packets via the backup routing path; and a loop prevention mechanism for determining that the network has converged and is loop-free.

2. A backup controller according to claim 1, wherein the backup controller further advertises a link failure to the network using a routing protocol.

3. A backup controller according to claim 1, wherein the backup routing path instructions include a label stack based on Multi-Protocol Label Switching (MPLS).

4. A backup controller according to claim 3, wherein the label stack includes labels for a packet source and a packet destination.

5. A backup controller according to claim 1, wherein the backup routing path is a Label Switched Path (LSP).

6. A backup controller according to claim 5, wherein the LSP is based on network topology information.

7. A backup controller according to claim 6, wherein the network topology information is derived from a network protocol.

8. A backup controller according to claim 1, wherein the computer network uses a label switching routing protocol.

9. A method of providing protection switching in the event of a link failure of a computer network routing node that delivers data packets to a computer network routing node that delivers data packets to a computer network via a plurality of links, the method comprising:
identifying, for at least one link of the routing node, a backup routing path for forwarding affected data packets in the event of a failure of the at least one link, wherein the backup routing path is identified prior to the failure of the at least one link;
monitoring the plurality of links to determine when a link fails;
when a link which has a backup routing path fails, attaching backup routing path instructions to affected data packets routed over the failed link;
forwarding the affected data packets via the backup routing path; and
determining that the network has converged and is loop-free using a loop prevention algorithm.

10. A method according to claim 9, further comprising advertising a link failure to the network using a routing protocol.

11. A method according to claim 9, further comprising establishing a new network route to replace a failed link.

12. A method according to claim 9, wherein the step of determining that the network has converged and is loop free uses a loop prevention algorithm.

13. A method according to claim 9, wherein the backup routing path instructions include a label stack based on Multi-Protocol Label Switching (MPLS).

14. A method according to claim 13, wherein the label stack includes labels for a packet source and a packet destination.

15. A method according to claim 9, wherein the backup routing path is a Label Switched Path (LSP).

16. A method according to claim 15, wherein the LSP is based on network topology information.

17. A method according to claim 16, wherein the network topology information is derived from a network protocol.

18. A method according to claim 9, wherein the computer network uses a label switching routing protocol.

19. A data router that delivers data packets to a computer network via a plurality of links, the router providing protection switching in the event of a link failure, the router comprising:
a data interference for data packets to enter and exit the router; and
a backup controller including:
a backup path manager that, for at least one link of the routing node,
identifies a backup routing path for forwarding affected data packets in the event of a failure of the at least one link, wherein the backup routing path is identified prior to the failure of the at least one link;
a link monitor that monitors the plurality of links to determine when a link fails;
a backup packet processor that, when a link which has a backup routing path fails, attaches backup routing path instructions to affected data packets routed over the failed link, and forwards the affected data packets via the backup routing path; and
a failed link recalculator that establishes a new network route to replace a failed link and determines that the network has converged and is loop free using a loop prevention algorithm.

20. A data router according to claim 19, wherein the router further advertises a link failure to the network using a routing protocol.

21. A data router according to claim 19, wherein the failed link recalculator uses a loop prevention algorithm after a link failure to determine that the network has converged and is loop-free.

22. A data router according to claim 19, wherein the backup routing path instructions include a label stack based on Multi-Protocol Label Switching (MPLS).

23. A data router according to claim 22 wherein the label stack includes labels for a packet source and a packet destination.

24. A data router according to claim 19, wherein the backup routing path is a next node on a Label Switched Path (LSP).

25. A data router according to claim 24, wherein the LSP is based on network topology information.

26. A data router according to claim 25, wherein the network topology information is derived from a network protocol.

27. A data router according to claim 19, wherein the computer network uses a label switching routing protocol.

28. computer network having a plurality of data packet streams, the network comprising:
a plurality of subnetworks, each subnetwork having at least one application that generates a stream of data packets for transmission over the computer network; and
a plurality of routers that deliver data packets to the network via a plurality of links, at least one router providing protection switching in the event of a link failure, the at least one router including:
a plurality of data interfaces for streams of data packets to enter and exit the at least one router; and
a backup controller having:
a backup path manager that, for at least one link of the routing node, identifies a backup routing path for forwarding affected data packets in the event of a failure of the at least one link, wherein the backup routing path is identified prior to the failure of the at least one link;
a link monitor that monitors the plurality of links to determine when a link fails; and
a backup packet processor that, when a link which has a backup routing path fails, attaches backup routing path instructions to affected data packets routed over the failed link, and forwards the affected data packets via the backup routing path; and a failed link recalculator that establishes a new network route to replace a failed link and determines that the network has converged and is loop-free using a loop prevention algorithm.

29. Computer network according to claim 28, wherein the at least one router further advertises a link failure to the network using a routing protocol.

30. Computer network according to claim 28, wherein the failed link recalculator uses a loop prevention algorithm after a link failure to determine that the network has converged and is loop-free.

31. A computer network according to claim 28, wherein the backup routing path instructions include a label stack based on Multi-Protocol Label Switching (MPLS).

32. A computer network according to claim 31, wherein the label stack includes labels for a packet source and a packet destination.

33. A computer network according to claim 28, wherein the backup routing path is a Label Switched Path (LSP).

34. A computer network according to claim 33, wherein the LSP is based on network topology information.

35. A computer network according to claim 34, wherein the network topology information is derived from a network protocol.

36. A computer network according to claim 28, wherein the computer network uses a label switching routing protocol.

37. A computer program product for use on a computer system for providing protection switching in the event of a link failure of a computer network routing node that delivers data packets to a computer network via a plurality of links, the computer program product comprising a computer-usable medium having computer-readable program code thereon, the computer readable program code including:

program code for identifying, for at least one link of the routing node, a backup routing path for forwarding affected data packets, the backup routing path to be used in the event of a failure of the at least one link, wherein the backup routing path is identified prior to the failure of the at least one link;

backup routing path for forwarding affected data packets in the event of a failure of the at least one link;

program code for, when a link which has a backup routing path fails, attaching backup routing path instructions to affected data packets routed over the failed link;

program code for forwarding the affected data packets via the backup routing path; and program code for using a loop prevention algorithm after a link failure to determine that the network has converged and is loop-free.

38. A computer program product according to claim 37, further comprising program code for advertising a link failure to the network using a routing protocol.

39. A computer program product according to claim 37, further comprising program code for establishing a new network route to replace a failed link.

40. A computer program product according to claim 37, wherein the backup routing path includes a label stack based on Multi-Protocol Label Switching (MPLS).

41. A computer program product according to claim 40, wherein the label stack includes a packet source and a packet destination.

42. A computer program product according to claim 37, wherein the backup routing path is a Label Switched Path (LSP).

43. A computer program product according to claim 42, wherein the LSP is based upon network topology information.

44. A computer program product according to claim 43, wherein the network topology information is derived from a network protocol.

45. A computer program product according to claim 37, wherein the computer network uses a label switching routing protocol.

46. A backup controller that provides protection switching in the event of a link failure of a routing node that delivers data packets to a computer network via a plurality of links, the backup controller comprising:

means for identifying, for at least one link of the routing node, a backup routing path for forwarding affected data packets in the event of a failure of the at least one link; wherein the backup routing path is identified prior to the failure of the at least one link means for monitoring the plurality of links to determine when a link fails;

means for attaching, when a link which has a backup routing path fails, backup routing path instructions to affected data packets routed over the failed link; means for forwarding the affected data packets via the backup routing path; and means for using a loop prevention algorithm after a link failure to determine that the network has converged and is loop-free.

47. A backup controller according to claim 46, further comprising means for advertising a link failure to the network using a routing protocol.

48. A backup controller according to claim 46, further comprising means for establishing a new network route to replace a failed link.

49. A backup controller according to claim 46, when the backup routing path instructions include a label stack based on Multi-Protocol Label Switching (MPLS).

50. A backup controller according to claim 49, wherein the label stack includes labels for a packet source and a packet destination.

51. A backup controller according to claim 46, wherein the backup routing path is a Label Switched Path (LSP).

52. A backup controller according to claim 51, wherein the LSP is based upon network topology information.

53. A backup controller according to claim 52, wherein the network topology information is derived from a network protocol.

54. A backup controller according to claim 46, wherein the computer network uses a label switching routing protocol.

* * * * *